March 31, 1953     D. P. REYNOLDS     2,633,254
APPARATUS FOR FEEDING OR SORTING SMALL FLEXIBLE ARTICLES
Filed Aug. 18, 1948     2 SHEETS—SHEET 2
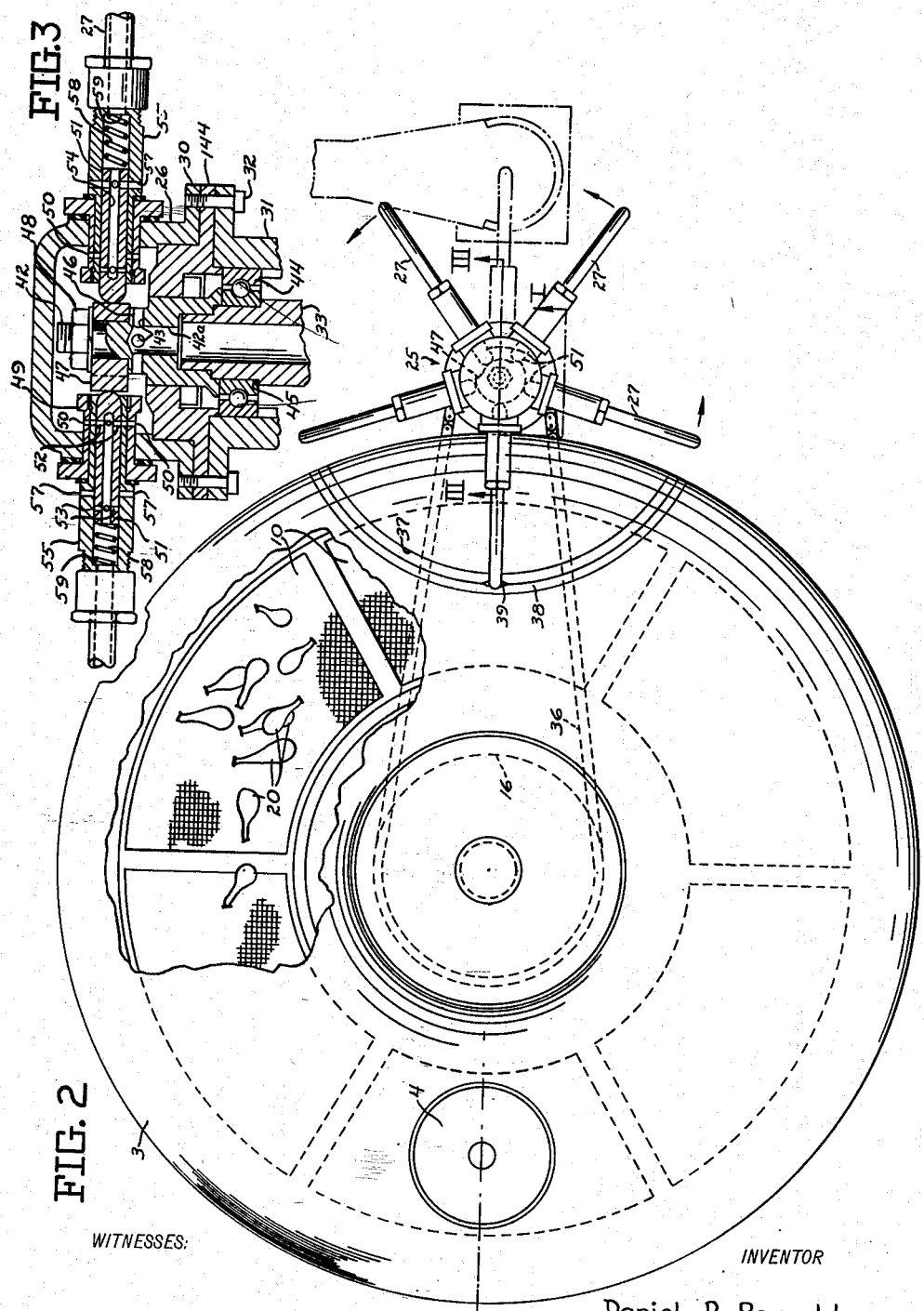
INVENTOR
Daniel P. Reynolds
BY
ATTORNEYS Patented Mar. 31, 1953

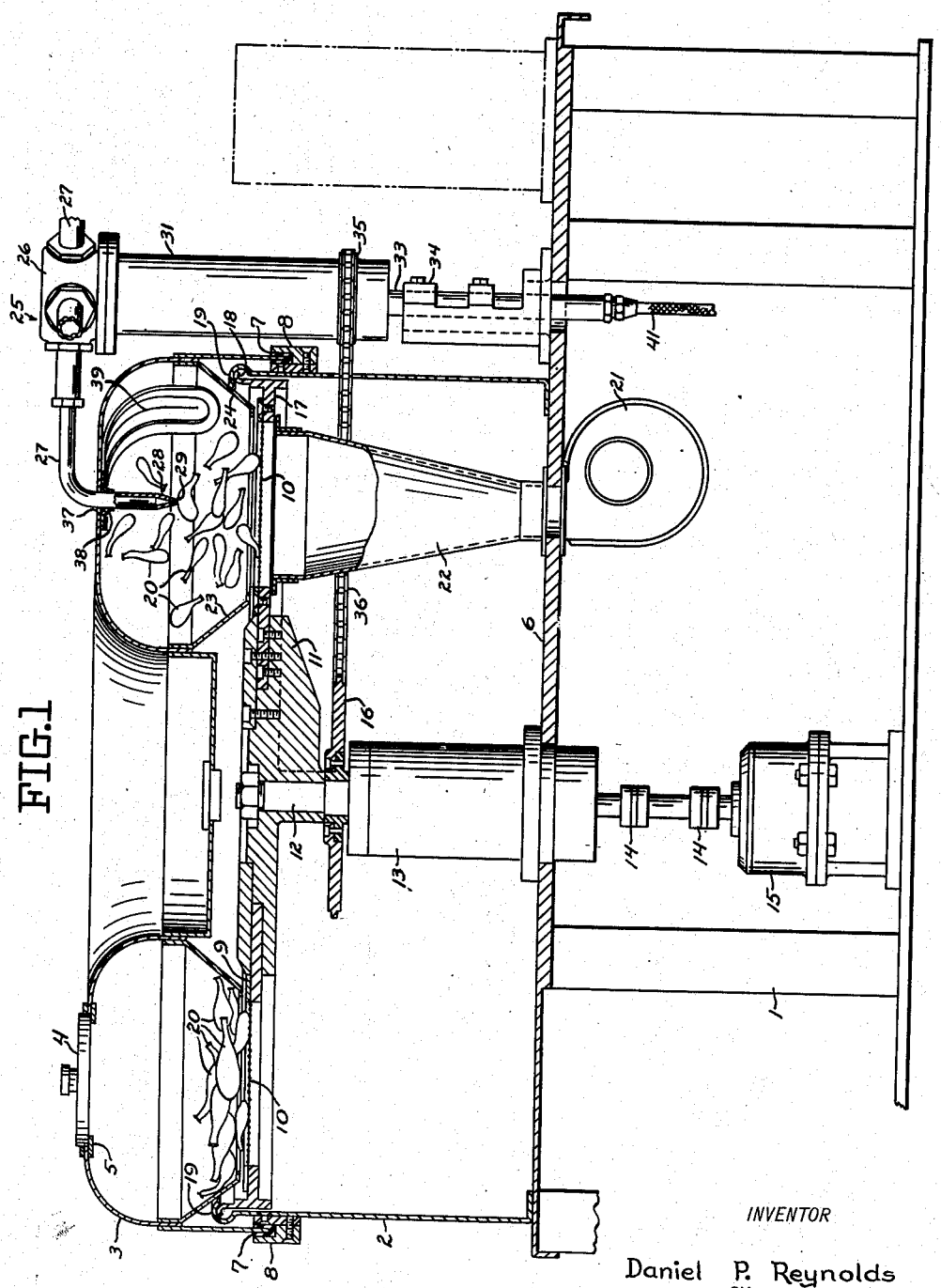

2,633,254

UNITED STATES PATENT OFFICE 2,633,254

APPARATUS FOR FEEDING OR SORTING SMALL FLEXIBLE ARTICLES

Daniel P. Reynolds, Massillon, Ohio, assignor to The Oak Rubber Company, Ravenna, Ohio, a corporation of Ohio Application August 18, 1948, Serial No. 44,965

10 Claims. (Cl. 214—17)

This invention relates in general to apparatus for sorting or feeding small flexible articles, especially to sorting or feeding small articles, such as balloons, and discharging them one at a time at a substantially uniform rate.

It will be realized that the manufacture of balloons today is a large scale operation with nearly all manufacturers of such articles making literally thousands of balloons in a day. Of course, these balloons are usually of various sizes and shapes and the handling, storage, shipment, packaging, etc., of these numerous small articles presents a serious problem, especially if the balloons are to be individually processed. In general, the balloon manufacturers use an appreciable amount of hand labor in the packaging and shipment of balloons. This hand labor, of course, has numerous disadvantages in that it is relatively expensive and slow. Also, it usually requires a relatively large plant space and may not be 100% accurate.

The general object of the present invention is to avoid and overcome the foregoing and other disadvantages of previous types of apparatus or methods for handling and packaging large numbers of small flexible articles, such as balloons.

Another object of the invention is to provide a relatively inexpensive, uncomplicated apparatus for feeding balloons, one at a time, at a uniform rate from a large volume of such articles.

Another object of the invention is to provide an automatic machine, having low maintenance expense, which will individually deliver balloons, or equivalent articles, at a given discharge point.

Another object of the invention is to utilize agitation, such as by an air stream, so as to separate balloons individually from a large mass of such articles.

Yet another object of the invention is to provide a compact machine which will be inexpensive to operate and which will effectively and individually sort and discharge individual articles from a large mass of such articles.

Another object of the invention is to provide a positive method of withdrawing single articles from a mass of such articles and depositing the articles at a desired place.

A further object of the invention is to provide an automatic machine which can be continuously operated for sorting or feeding large numbers of small flexible articles.

The foregoing and other objects and advantages of the invention will be made more apparent as the specification proceeds.

Attention is now directed to the accompanying drawing, wherein:

Fig. 1 is an elevation, partially in section, of apparatus embodying the principles of the invention, which section is taken substantially on line I—I of Fig. 2;

Fig. 2 is a plan view, partially broken away, of the apparatus of Fig. 1; and

Fig. 3 is a fragmentary enlarged section taken on line III—III of Fig. 2.

Broadly speaking, the present invention can be said to include an annular member adapted to receive thereon the articles to be sorted, which articles can be dumped on such annular member in bulk, and means are provided for rotating the annular member. A second or spider-like member is positioned adjacent the annular member and is rotated so as to intersect the path of movement of the annular member at one portion of the circumference of the circular movement of the spider member. Agitating means are associated with the annular member at the portion of its movement wherein it is adjacent the spider member and the spider member is connected to a vacuum generator means whereby articles on the annular member will be individually drawn against portions of the arms of the spider member as the spider rotates through the path of movement of the annular member. Thereafter, upon individual release of the vacuum on the spider arms, any articles supported thereby will be deposited at a predetermined and fixed point in the rotational movement of the spider arms.

Now, referring in detail to the structure shown in the accompanying drawing, corresponding reference numerals will be used to refer to corresponding parts in the drawing and the specification. The apparatus includes any desired type of a frame 1 which may include a cylindrical section 2 at the upper portion of the frame and a hood 3 is associated with the frame to form an upper cover therefor. A removable cover or lid 4 may be positioned over an opening 5 in the upper portion of the hood 3. The frame 1 may include a horizontally positioned support plate 6 which is associated with an intermediate portion of the frame, and if desired may cooperate with the remainder of the apparatus to form an airtight enclosure in the upper portion of the apparatus for a reason to be hereinafter explained in more detail. In all events, the hood 3 is secured to the remainder of the apparatus in an airtight manner, so that a conventional resilient gasket 7 is associated with the lower end of the hood 3 and a split lock ring 8 is shown for securing the gasket 7 and lower portion of the hood 3 to the upper portion of the cylindrical section 2 of the frame. The actual support for the articles to be separated, sorted or fed by the apparatus of the invention includes a flat, annular member 9 which usually comprises a metal sheet, or disc, or other device which has relatively large arcuate screen segments 10 secured thereto over corresponding cut out sections in the member. The annular member 9 is removably secured to and supported by a metal plate 11 which, in turn, is supported by a shaft 12. The shaft 12 extends down through a suitable bearing or housing 13 and is connected through conventional coupling devices 14 to a drive motor, or other driving unit, which is represented at 15. The housing 13 also may function as a support for a sprocket 16 which is secured to the shaft 12 immediately adjacent the upper end of the housing 13. Since the shaft 12 is driven, the annular member 9 fixedly associated therewith by means of any conventional devices will be rotated through a given or fixed path which normally will lie in a horizontal plane. Fig. 1 best shows that the annular member 9 may have a more or less T-shaped (in a radial direction) section 17 formed at its periphery. This section 17 is provided with an annular flange 18 which extends outwardly of the annular member and which is arcuate in cross section. The flange 18 normally is received in an arcuate inwardly turned flange 19 formed on the upper section of the cylindrical section 2 of the frame whereby the engagement of the flanges 18 and 19 aids in retaining the annular member 9 in a given plane for movement therein, and in substantially sealing the connection therebetween.

As a feature of the invention, means are provided for agitating articles, such as balloons 20, which are carried by the annular member 9 and such agitation means normally is associated with only one portion of the annular member whereby balloons carried by the annular member are agitated at one arc in a revolution of the member carrying the balloon. Thus there is shown in the drawing a conventional air compressor 21 which is driven in a suitable manner and connected to a hood member 22 that extends from the compressor 21 up to a point immediately adjacent and below one portion of the annular member 9. Thus in operation the air stream from the compressor 21 will cause the balloons 20 to scatter and individually move upwardly in an irregular manner from the surface of the annular member 9. Use of screen segments 10 in the annular member, of course, facilitates this blowing or agitating action of balloons carried by the annular member. Inclined annular guides 23 and 24 may be secured to the hood 3 adjacent the lower portion thereof and extend inwardly therefrom, with the two guides 23 and 24 extending towards each other, as best shown in Fig. 1 and terminating immediately above the member 9. These guides aid the balloons in falling on and being retained in the center portion of the annular member or rather, the desired radial extent of such annular member. Balloons are normally fed to the annular member, it will be understood, by merely taking off the cover lid 4 and dumping a batch of balloons onto the annular member 9 as it is rotating underneath the cover opening. Use of the enclosure, as shown, positioned around the annular member 9 is desirable when agitating the balloons by an air jet.

Another salient feature of the present invention resides in the use of a rotary member which is used to pick up, individually, balloons moving upwardly from or agitated with relation to the annular member 9. Hence the drawing shows a spider 25 which has a hub 26 and a plurality of tubular nozzle arms 27 extending therefrom.

Each of the nozzle arms 27 terminates in a downwardly directed end section 28 which actually has the nozzle opening 29 formed therein so that a downwardly directed nozzle portion is formed on each of the nozzle arms. The spider 25 is positioned in any conventional manner and Fig. 3 of the drawing best shows that the hub 26 may have a radially outwardly extending flange 30 formed at the lower edge thereof. This flange 30 may then be bolted to a sleeve 31 by means of bolts 32. The sleeve 31 is shown in Fig. 1 and in turn may be supported upon a shaft 33 that is supported as in a conventional support 34 which in turn is secured to the frame 1. The sleeve 31 is shown provided with a sprocket 35 thereon which engages with a chain 36 that in turn engages with the sprocket 16 carried by the shaft 12, whereby the shaft 12 and the sleeve 31 may be and are driven as a unit. The sleeve 31 so positions the spider 25 that the arms 27, as they are rotated, intersect with and pass above the annular member 9 as it is moving through its given rotational movement. Since both the annular member 9 and the spider 25 are rotated, and usually in opposite directions, and the spider is so positioned that it only has one portion thereof in association with the annular member at one time, there may be any desired relative movement between the two members. Fig. 2 shows that the arms 27 extend in about one-half the radial width of the screen segments 10. In order that the nozzle arms 27 may intersect with the hood 3 and pass relatively closely to the upper surface of the annular member 9, a slot 37 is formed in the hood 3 adjacent the sleeve 31. This slot 37 is of arcuate shape, in projection, as indicated in Fig. 2, and the slot may be provided with a resilient cover strip 38 suitably associated with the slot 37 so as to close same normally but which has a slit 39 therein to permit passage of the nozzle arm therethrough.

Normally, vacuum generating means are associated with the spider 25 so as to set up a vacuum on the nozzles 29 and permit them to pick up balloons 20 as the ends 28 move across the hood 3. Thus, a conventional conduit 41 is connected to the lower end of the shaft 33, with the shaft 33 being of tubular construction so that vacuum generating forces supplied to the apparatus can be transmitted through the shaft 33 and to the upper end of this shaft 33, on which the sleeve 31 is journaled. An end stud 42 is fixedly secured to the upper end of the stationary support shaft 33 in any desired manner and has a bore 42ª that connects to the bore of the shaft 33. The end stud 42 has a plurality of discharge ports 43 formed therein and connecting to the bore 42ª so as to transmit vacuum generating forces therethrough into the interior of the hub 26 of the spider. Conventional ball bearings rotatably position the sleeve 31 on the shaft 33 and a shoulder 45 may be formed on the upper portion of the shaft 33 to aid in retaining an upper bearing 44 in a desired position. A plate-like guide 144 may be secured to the sleeve 31 and extend to a position adjacent the stud 42. The end of the stud 42 has a shoulder 46 formed thereon and a cam 47 is engaged with the stud 42 and seated against the shoulder 46. The cam 47 extends laterally beyond the stud 42 and is secured in a given position by means of a lock nut 48 which is engaged with the stud 42 and drawn down tightly against the cam 47 with a conventional lock washer being positioned therebetween.

Suitable valve means are associated with the spider 25, and controlled by the cam 47 so as to connect the bores of the different nozzle arms 27 of the spider to the interior of the hub 26 so as to set up vacuum generating forces within the nozzle arms 27. That is, vacuum must be set up in the nozzle arms 27, individually, as they rotate around the shaft 33 and such vacuum generating forces then, in turn, must be shut off from the individual nozzle arms at different arcs of their rotation so that three or four of the nozzle arms could have a vacuum generating force set up thereon concurrently and one or more of the nozzle arms to be released from the vacuum generating force at that time. Hence, as the spider 25 rotates, valves in the nozzle arms must change their setting and such valve means may include a tubular valve sleeve 49 which is associated with the hub 26 adjacent the base of each of the nozzle arms 27 and connects the bores thereof. Each of the valve sleeves 49 is provided with one or more vacuum ports 50 which extend diametrically therethrough. Valve action is actually controlled by means of tubular valve bodies 51 with a valve body 51 being received within each of the valve sleeves 49. Each of the valve bodies 51 is provided with inlet ports 52 and exhaust ports 53 with connecting bores 54 extending substantially the complete length of the valve body and terminating in vacuum ports at the radially outer end of each valve body. Each of the nozzle arms 27 connects to an adapter tube 55 which in turn extends inwardly through the valve sleeve 49 and actually positions the valve bodies 51 for limited axial movement therein. The adapter tubes 55 are secured in place in any desired manner. Each of these adapters 55 is provided with at least two diametrically opposed exhaust ports 57. The exhaust ports 57 in the adapter tubes 56 are adapted to register, of course, with the exhaust ports 53 formed in the valve bodies 51, when the valve bodies are moved to their radially inner position, as indicated in the upper right hand portion of Fig. 3. Fig. 3 also indicates that the valve bodies 51 can move radially outwardly of the spider 25 to bring the inlet ports 50 and 52 into registry to permit vacuum generating forces to connect to the interior of each of the nozzle arms 27 and effect a vacuum or suction force at the nozzle opening 29. The inlet ports 50 also extend through the walls of the adapter tubes 55. However, when the valve bodies are moved inwardly to their exhaust position, then the vacuum generating force will be broken and atmospheric air is permitted to enter the nozzle arms through the ports 53 and 57 and effect dropping or release of any articles secured to the nozzle openings 29 by means of the vacuum force originally set up thereon. Normally the valve bodies 51 are urged inwardly of the spider 25 by means of coil springs with a coil spring 58 being positioned in each of the adapters 55 and seating on a shoulder 58 formed therein. The coil springs 58 are compressed between the shoulder 59 and the radially outer end of the valve body 51. Fig. 2 best indicates the general shape of the cam 47 which is adapted to move the valve bodies radially with relation to the arms 27 of the spider member 25 so as to control valve action therein and transmittal of vacuum generating forces therethrough. Fig. 3 shows that the radially inner end of the valve body 51 may be of semi-spherical shape in order to provide smooth bearing contact between the cam 47 and the valve body, as the spider 25 rotates around the cam.

It will be appreciated that the specific valve means shown and described herein may be altered, as desired, without deviating from the valve action and control provided thereby.

While use of the apparatus and method of the invention have been specifically described with relation to balloons, it will be appreciated that any small, flexible or resilient, and light weight article may be processed by the device of the invention. The amount of vacuum generating force set up on the apparatus should be so correlated to the weight of the articles being processed that the vacuum on each of the nozzles of the spider member will only be sufficient, normally, to secure one resilient article to the nozzle end. The apparatus of the invention has been successfully used to process articles up to a speed of about three hundred articles per minute.

From the foregoing, it should be apparent that a sturdy, relatively inexpensive, apparatus has been provided that can automatically function to separate individual balloons from a large mass of such articles. By agitating the balloons at the point of pickup of the balloons by the spider member, one achieves a redistribution of all of the balloons on the annular member 9 with each rotation of same whereby no excessive accumulation of balloons may develop at any radial portion of the annular member. If desired, the spider member could even intersect a larger radial length of the screen segments 10 to prevent any possibility of accumulation of balloons on the radially inner portion of the screen elements. It will be realized that any desired support may be provided for the member 9 which may have any desired cover or cover segment, or guard plates associated therewith.

While in accord with the patent statutes, I have specifically illustrated and described certain best known embodiments of my invention, it is to be particularly understood that I am not to be limited thereto or thereby, but that the scope of my invention is defined in the appended claims.

I claim:

1. Apparatus for sorting or feeding small flexible articles at a uniform rate, which apparatus comprises a perforated annular member on which the articles are received, means for rotating said member, means for blowing the articles on said member upwardly of said member at one portion of its rotational movement, a spider member having arms thereon, means for rotating said spider member so that the ends of the arms of same pass above said annular member in opposed relation to said blowing means, a nozzle carried by said spider member on each arm at the end thereof, means for setting up a vacuum on said nozzles when opposed to said blowing means to draw an article against same, and means for releasing the vacuum on each of said nozzles as it passes a predetermined rotational point to release an article in desired relation to the release of other articles by the apparatus.

2. Apparatus as in claim 1 wherein an enclosure surrounds said annular member, said enclosure having an arcuate opening therein for passage of said spider arms therethrough, and a resilient seal is provided to close the opening in said member for said spider arms.

3. Apparatus for feeding small flexible articles at a uniform rate, which apparatus comprises an annular member on which the articles are received and which has apertures therein, means for rotating said member, means for blowing any articles on said member upwardly of said member at one portion of its rotational movement, a second member, means for rotating said second member so that one portion thereof passes above said first member in opposed relation to said blowing means, a plurality of outlet means carried by said second member on spaced peripheral portions thereof, means for setting up a vacuum on said outlet means when opposed to said blowing means to pick up an article on the end thereof, and means for releasing the vacuum on each of said outlet means as it passes a predetermined rotational point to release an article in desired relation to the release of other articles by the apparatus.

4. Apparatus for feeding small flexible articles at a uniform rate, which apparatus comprises a perforated annular member on which the articles are received, means for rotating said member, means for blowing the articles upwardly of the member at one portion of its rotational movement, a spider member having arms thereon, means for uniformly rotating said spider member with the ends of the arms of same passing above said annular member but moving in the opposite direction thereto in opposed relation to said blowing means, a downwardly directed nozzle carried by said spider member on each arm at the end thereof, vacuum supply means, a valve connecting to said means, means connected between said nozzles and said valve for setting up a vacuum on said nozzles when opposed to said blowing means to draw an article against the end thereof, and means for releasing the vacuum on each of said nozzles at a predetermined rotational point of said spider.

5. Apparatus for feeding small, light articles at a uniform rate comprising a perforate annular member for carrying a mass of articles, a chamber encompassing said member, said chamber having an arcuate arm receiving slot formed therein, means for rotating said member, a nozzle arm having an opening therein, means for rotating said nozzle arm to pass it and the opening therein through said slot in said chamber during one arc of its rotation, said nozzle arm being adjacent said member when in said chamber, means for blowing articles on said member upwardly therefrom when adjacent said nozzle arm, and means for setting up a vacuum on the opening of said nozzle arm as it passes through said chamber to draw an article against said nozzle arm.

6. Apparatus as in claim 3 wherein said two last-mentioned means include a spider having a hub and a plurality of tubular arms extending outwardly therefrom, said spider forming part of said second annular member, journal means engaging with said hub to support said spider for rotational movement, a plurality of valve sleeves positioned in engagement with said hub and extending inwardly thereof, each of said valve sleeves having an inlet port therein and each being connected to a spider arm, a tubular connector valve slidably received in each of said spider arms, each connector valve having an inlet and an outlet and an exhaust port formed therein with the outlet port being permanently connected to the bore of the associated arm, each of said spider arms having an exhaust port formed therein, a cam stationarily positioned within said hub, and resilient means associated with each spider arm for urging said connector valves against said cam which controls the valve action and pressure in the individual arms of said spider.

7. Apparatus for sorting or feeding small flexible articles, which apparatus comprises a disclike member on which the articles are received, means for rotating said member, an arm member, means for rotating said arm member so that one portion of same intersects and passes above said disc member, downwardly directed nozzle means carried by said arm member on the portion thereof passing adjacent said disc member, means for blowing the articles upwardly from said disc member to positions adjacent said nozzle means, and means for setting up a vacuum generating force on said nozzle means when adjacent to said disc member to pick up an article on said nozzle means and retain same thereagainst.

8. Apparatus for sorting or feeding small flexible articles, which apparatus comprises a disclike member on which the articles are received, means for rotating said member, means for agitating the articles on the member at one portion of its rotational movement and for moving the articles upwardly from the member, an arm member, means for rotating said arm member so that one portion of same intersects and passes above and spaced from said disc member and any articles thereon adjacent said agitating means, said arm member intersecting said disc member at only one arc of the rotation of said arm member, nozzle means carried by said arm member on the portion thereof passing adjacent said disc member, said nozzle being spaced from said disc member and articles thereon, means for setting up a vacuum on said nozzle when adjacent said agitating means to pick up an article on said nozzle and temporarily retain same thereagainst, and an enclosure surrounding said disc member, said enclosure having an arcuate opening therein for passage of said arm member therethrough.

9. Apparatus for withdrawing single articles from a mass of such articles including a member on which the mass of articles is received, means for rotating the member, at least one nozzle arm movably mounted adjacent the member and having an opening adapted to pass over the member, said nozzle arm being connected to a source of vacuum, means associated with the member for blowing the articles into the space above the member adjacent the path of the nozzle arm whereby an article blown into the area of the opening is drawn to and held by the nozzle arm by the pressure differential at the opening, and valve means for automatically cutting off the nozzle arm from the vacuum source when the nozzle opening moves out of the space above the member.

10. Apparatus for sorting or feeding small flexible articles, which aparatus comprises a disclike member on which the articles are received, means for rotating said member, means for agitating the articles on the member at one portion of its rotational movement and for moving the articles upwardly from the member, an arm member, means for rotating said arm member so that one portion of same intersects and passes above said disc member adjacent said agitating means, said arm member intersecting said disc member at only one arc of the rotation of said arm member, a downwardly extending nozzle means carried by said arm member on the portion thereof passing adjacent said disc member, means for setting up a vacuum on said nozzle when adjacent said agitating means to pick up an article on said nozzle and temporarily retain same thereagainst, and means for releasing the vacuum on said nozzle as it passes a predetermined rotational point to release the article secured thereto in desired relation to the release of other articles by the apparatus, said arm member comprising a spider and said last two means including journal means engaging with said spider to position same for rotational movement, said spider having a plurality of sleeve arms extending outwardly therefrom, means for rotating said spider, vacuum supply means connected to the inner ends of said arms, valve means slidably received in each of said arms for axial movement therein to control the connection of the individual arms to said vacuum supply means, a cam stationarily positioned within said hub, and resilient means associated with each arm for urging said valve means therein against said cam which controls the pressure in the individual arms of said spider as same is rotated.

DANIEL P. REYNOLDS.

REFERENCES CITED

The following references are of record in the file of this patent:

UNITED STATES PATENTS

| Number | Name | Date |
|---|---|---|
| 1,329,060 | Paridon | Jan. 27, 1920 |
| 1,958,846 | Christensen | May 15, 1934 |
| 2,093,437 | Gwinn | Sept. 21, 1937 |
| 2,096,264 | Schutz | Oct. 19, 1937 |
| 2,176,307 | Lamb et al. | Oct. 17, 1939 |
| 2,198,976 | Rober | Apr. 30, 1940 |
| 2,224,975 | McNamara | Dec. 17, 1940 |
| 2,247,787 | Schmidt | July 1, 1941 |
| 2,359,433 | McNamara | Oct. 3, 1944 |
| 2,517,388 | Daves | Aug. 1, 1950 |
| 2,538,972 | Magnani | Jan. 23, 1951 |